United States Patent [19]
Tomotoshi

[11] Patent Number: 5,860,515
[45] Date of Patent: Jan. 19, 1999

[54] SLIDE SWITCH DEVICE

[75] Inventor: Tetsuya Tomotoshi, Tokyo, Japan

[73] Assignee: Niles Parts Co., Ltd., Japan

[21] Appl. No.: 864,382

[22] Filed: May 28, 1997

[30] Foreign Application Priority Data

May 29, 1996 [JP] Japan .................................. 8-156398

[51] Int. Cl.[6] .............................................. H01H 15/06
[52] U.S. Cl. ......................... 200/550; 200/549; 200/292
[58] Field of Search .................................. 200/550, 549, 200/547, 292, 252, 253

[56] References Cited

U.S. PATENT DOCUMENTS

| | | | |
|---|---|---|---|
| 4,057,520 | 11/1977 | Schwartz | 200/292 |
| 4,152,565 | 5/1979 | Rose | 200/292 |
| 4,316,067 | 2/1982 | Whiteman, Jr. | 200/292 |
| 5,389,754 | 2/1995 | Muller et al. | 200/292 |

Primary Examiner—David J. Walczak
Attorney, Agent, or Firm—Rader Fishman & Grauer; Ronald P. Kananen

[57] ABSTRACT

A slide switch device adapted to be immersed in automatic transmission oil or the like. A printed circuit board 1 is provided with fixed contacts 11. A guide rail 19 is formed extending in a sectional T-shaped form from a side surface of the printed circuit board 1. A movable board 3 has a movable contact 2 and a pin 5 press-fitted therein. An operating member 4 has an elongate hole 42 for receiving the pin 5, a retaining portion 44 for a slide member 6, and a coupling portion 47 for coupling to a manual valve 9 of an automatic transmission. The retaining portion 44 is formed with a cut-out 45 extending from one side thereof to have an open edge. At the open edge is formed a crimp piece 46 through a connecting portion 49 of a reduced section for retaining the slide member 6. The slide member 6 has a slide portion 61 in a channel form for being fitted on the guide rail 19 of the printed circuit board 1, band a groove portion 63 formed between the slide portion 61 and a head portion 62 for being fitted to the cut-out 45 of the operating member 4. A frame body 7 has an open hole 72 formed in a lower portion 71 to a size sufficient for slidably receiving the pin 5 and freely passing liquid therethrough, and a crimp piece 74 formed in a side portion. The open hole 72 has opposite edges formed by downwardly slanted surfaces 73 for allowing the oil intruded within the frame body 7 to flow out.

13 Claims, 5 Drawing Sheets

SLIDE SWITCH DEVICE

BACKGROUND OF THE INVENTION

1. Field of the Invention

The present invention relates to slide switch devices having a movable board for supporting a movable contact and a printed board for supporting a fixed contact with which the movable contact slidably contacts and, more particularly, to a slide switch device which is adapted to be immersed in automatic transmission oil or the like for automobiles.

2. Description of Prior Art

A conventional slide switch device adapted to be immersed in automatic transmission oil or the like is disclosed, for example, in Japanese Utility Model Unexamined Publication (Kokai) No. H4-65622. This conventional slide switch device has a fixed contact and a movable contact within a case enclosed by using an O-ring, and a rod movably supported by a bellows to have one end connected to the movable contact and the other end connected to a manual valve. With such structure, the movable contact is brought into contact with the fixed contact in a manner corresponding to the operational position of the manual valve.

In the above conventional structure, however, the fixed contact has a contact surface directed upward for the movable contact, and accordingly the fixed contact is apt to have foreign matters on the surface thereof. Consequently, where conductive foreign matters such as metal powder, and the like, are deposited on the surface of the fixed contact, there is a possibility of incurring troubles, such as poor insulation and the like. In particular, when used for an automatic transmission where oil temperature largely varies in dependence upon operating conditions of the engine, the air within the enclosed space will expand or contract. Furthermore, the operation of the rod and the bellows causes the difference of pressure between the space inside and the outside, thereby inducing the phenomenon of introducing oil into the enclosure space. As a result, there is a high possibility of introducing conductive foreign matters together with oil. Therefore, the conventional structure requires accommodation of the fixed contact and other components in a manner isolated from the outside. However, the complete enclosure of a case creates other problems in that the case is expensive to make and the structure is complicated.

Under such circumstances, the present applicant has previously proposed an in-liquid switch device which is adapted to have less deposits of conductive foreign matters on the surface of the fixed contact to prevent troubles, such as poor insulation or the like, even if used in a contaminated liquid having conductive foreign matters mixed therewith, such as an oil within an automatic transmission. In this proposed structure, the troubles of poor insulation and the like are eliminated, but there is still insufficient smoothness of sliding for the movable board.

SUMMARY OF THE INVENTION

The present invention has been made in view of the above-stated problems. It is the object of the present invention to provide a slide switch device having a movable board arranged for smooth sliding.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, in order to solve the problems described above, there is provided a slide switch device having a movable contact, a movable board for supporting the movable contact, a fixed contact with which the movable contact is in slidable contact, and a printed board for supporting the fixed contact. The slide switch device comprises a guide rail provided on a printed board side so as to extend in a direction that the movable contact slides, and a slide portion fitted on the guide rail being provided in an operating member for driving the movable board.

A pin is projectingly provided in the movable board, and an elongate hole that is long in a direction perpendicular to the sliding direction of the movable board is provided in the operating member. The operating member is formed in a channel form that is in contact with the guide rail.

The slide portion is arranged in the vicinity of an external input position with respect to the operating member. A slide member having the slide portion is formed separately from the operating member, and a crimp piece for fixing the slide member is integrally formed with the operating member.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

A slide switch device according to a first embodiment of the present invention will now be described with reference to FIGS. 1 to 9 of the drawings.

Figure 4:
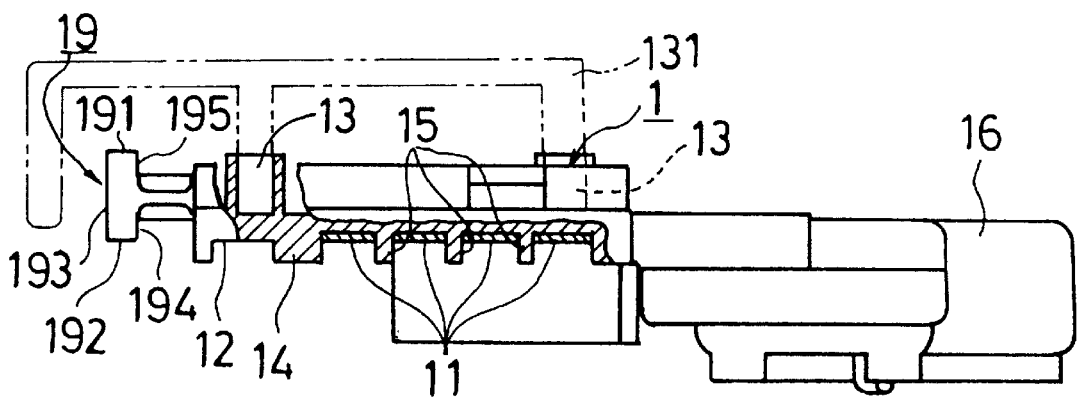
FIG. 4 is a side view showing a printed board of the first embodiment, showing an essential part in section.
Figure 5:
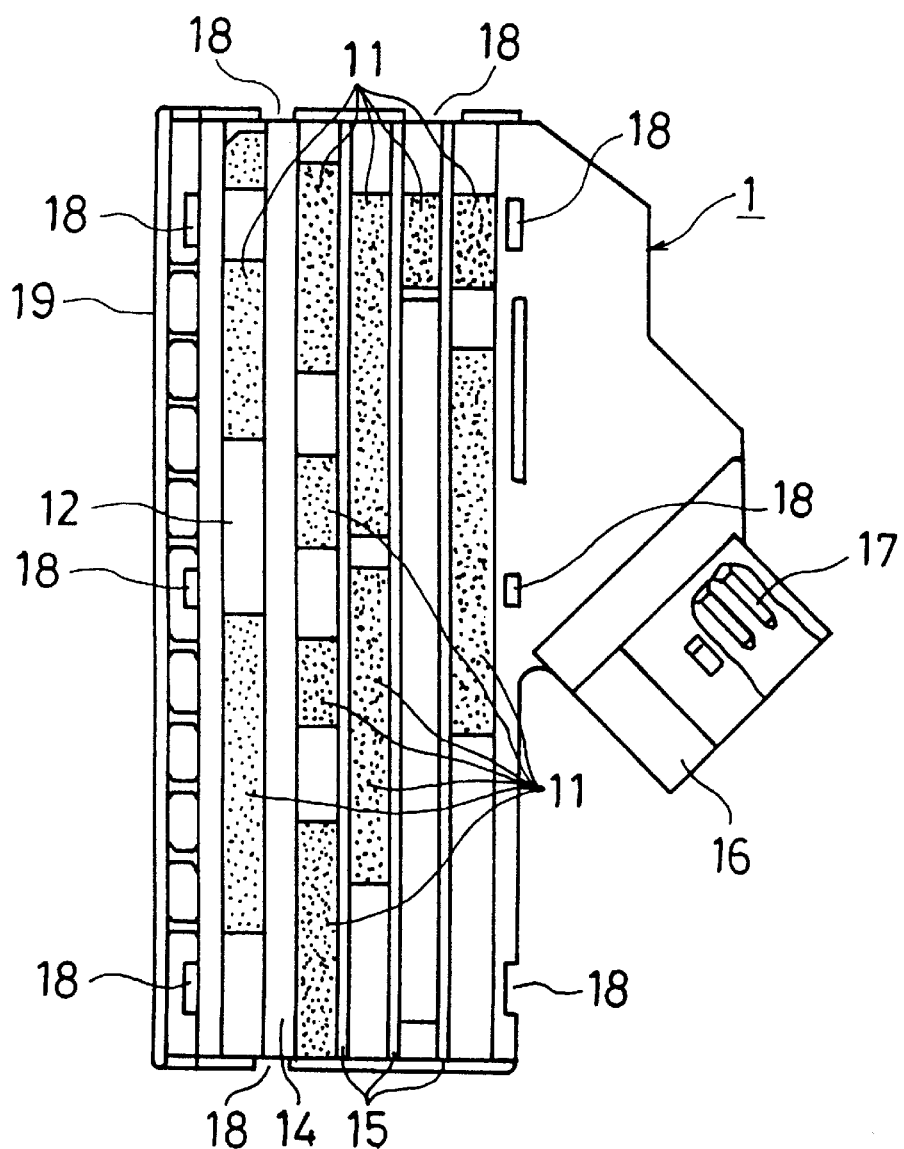
FIG. 5 is a bottom plan view of the printed board of the first embodiment.

The slide switch device according to the first embodiment includes a printed circuit board 1, which is formed of a synthetic resin to have thermal resistance and oil resistance so as to withstand the conditions when it is used by being immersed in high-temperature oil of an automatic transmission. The printed circuit board 1, as shown in FIGS. 4 and 5, has five rows of fixed contacts 11 at a back surface thereof. The fixed contacts 11 are formed of a 42Ni—Fe iron-nickel alloy to have a slide portion with which a movable contact 2 is to be slidably contacted.

A first wall 14 and a plurality of second walls 15 are provided along the fixed contact 11. The first wall 14 and the second walls 15 are structured to have the dual functions of raising insulation between the fixed contacts 11 and the guiding protuberances 31 of a movable board 3, as described below.

The printed circuit board 1 has a guide rail 19 extending over the entire length thereof in parallel with the fixed contacts 11. The guide rail 19 is a member which extends in a sectional T-form from a side surface of the printed circuit board 1. The guide rail 19 has a pair of first and second, or upper and lower, guide surfaces 191, 192 extending in parallel with each other, and three guide surfaces 193, 194, and 195 each perpendicular to the first or second guide surfaces 191, 192.

The printed circuit board 1 is integrally formed with a connector 16 within which projects a terminal 17 that is in electrical connection to the fixed contact 11. Furthermore, the printed board 1 is provided with crimp portions 18 at several points in a peripheral edge thereof. The crimp portions 18 are for crimping of crimp pieces 74 of a frame member 7, as described below. The printed circuit board 1 has a top surface, opposite to the fixed contacts 11, formed with two positioning holes 13, 13 with which respective positioning pins 131 of an operating member 4 are engaged.

Figure 1:
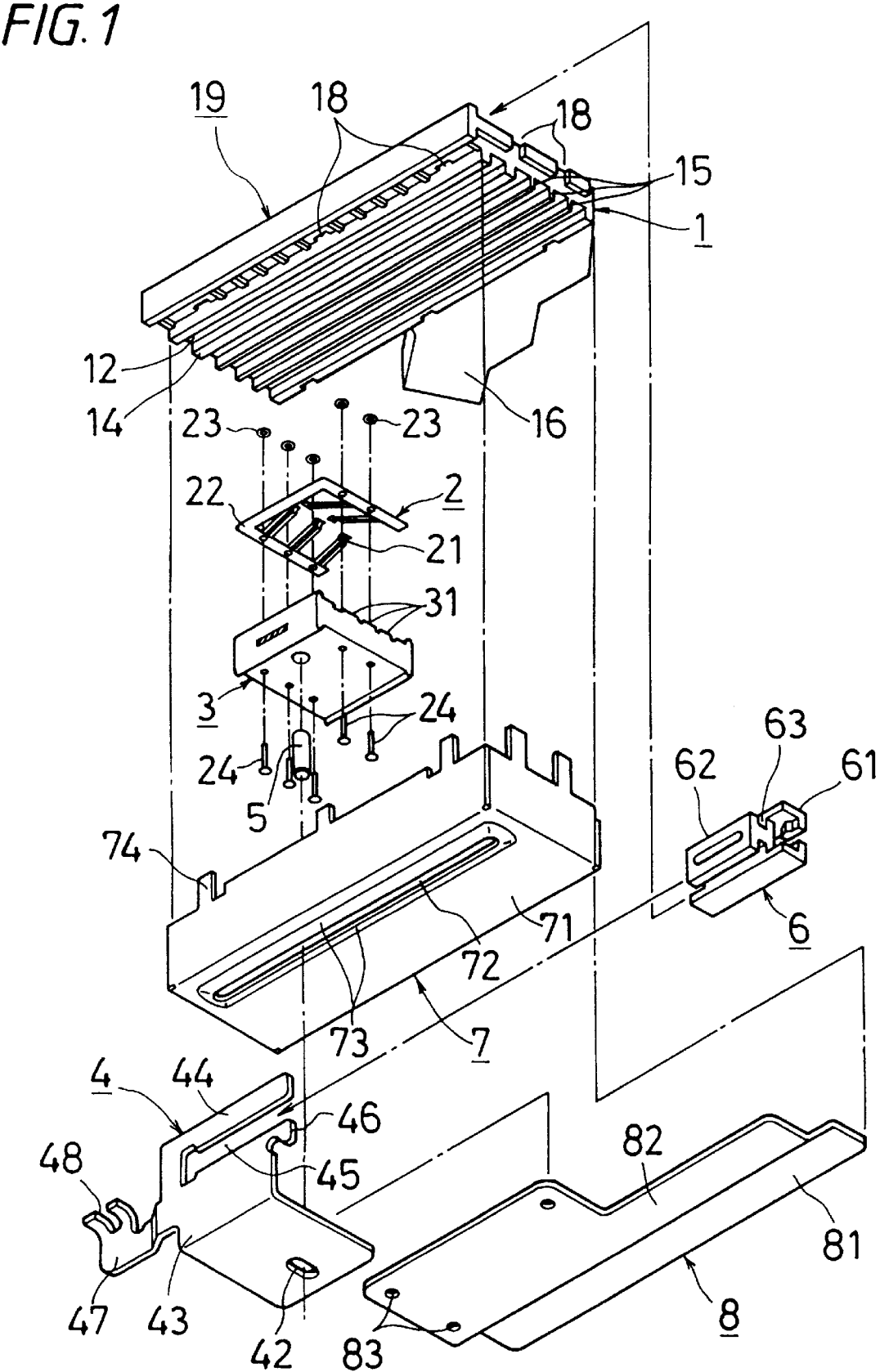
FIG. 1 is an exploded perspective view of a slide switch device showing a first embodiment of the present invention.

The movable contact 2 is formed by a stainless steel sheet so that it is in slidable contact with the fixed contacts 11. The movable contact 2, as shown in FIG. 1, has five contact pieces 21 corresponding to the number of rows of the fixed contacts 11 such that they alternately extend from opposite sides of a rectangular U-shaped frame 22. Each contact piece 21 is formed by a pair of thin strips to secure desirable elasticity. The movable contact 2 is attached through U-shaped frame 22 to the movable board 3 by using washers 23 and rivets 24.

The movable board 3 is formed of a synthetic resin that possesses heat resistance and oil resistance similar to the printed board 1. The movable board 3 has protuberances 31 on an end edge attaching with the movable contact 2 for wiping the surface of the fixed contact 11, and a pin 5 press-fitted in an opposite surface to the protuberances 31 at a longitudinal center location of the movable board 3 that coincides with a centerline of the first wall 14 of the printed board 1. The provision of the pin 5 at such location prevents moment from occurring in the movable board 3 due to an operating force transmitted from the pin 5 to the movable board 3.

Figure 2:
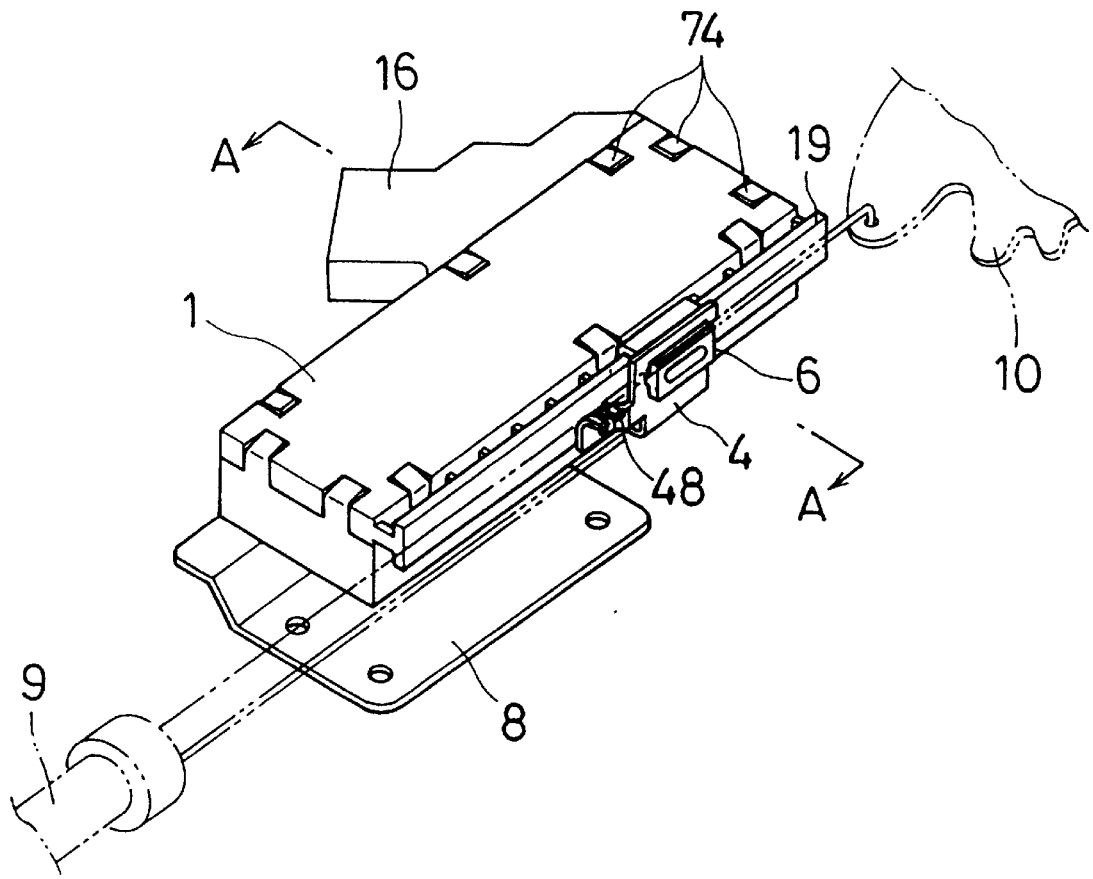
FIG. 2 is a perspective view of the slide switch device shown in FIG. 1, showing a state in which the slide switch is being coupled to a manual valve and a detent lever.
Figure 3:
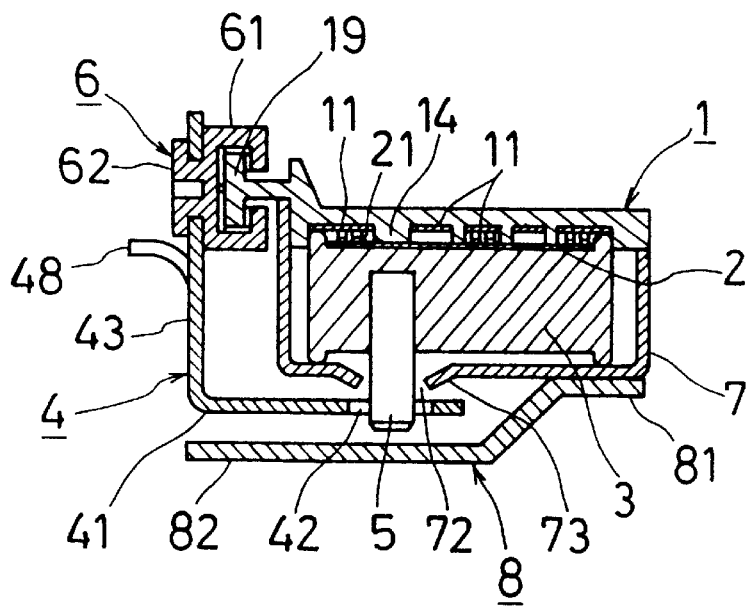
FIG. 3 is a sectional view of the first embodiment taken on line A—A in FIG. 2.
Figure 6:
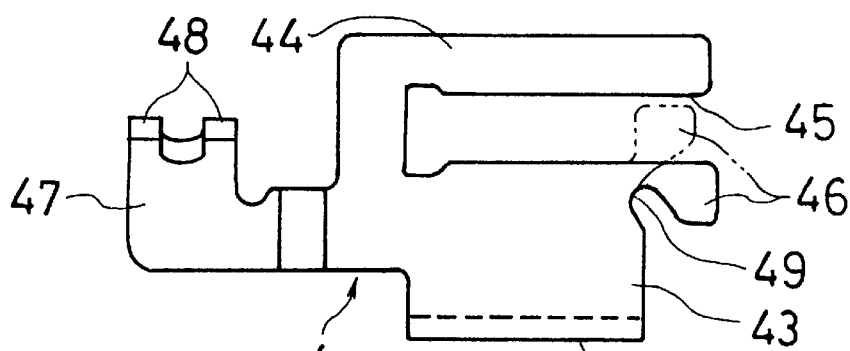
FIG. 6 is an elevational view showing an operating member of the first embodiment.
Figure 7:
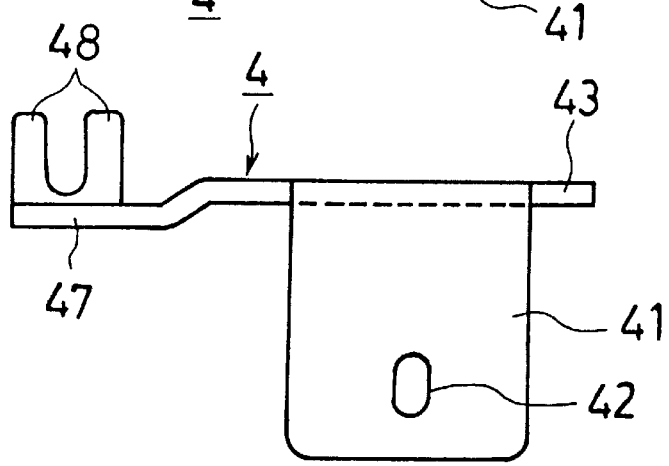
FIG. 7 is a bottom plan view of the operating member of the first embodiment.

The operating member 4, as shown in FIGS. 6 and 7, is formed by a member of generally an L-form in section that is press-formed from a metal sheet. The operating member 4 has a horizontal piece 41 formed with an elongate hole 42 for receiving therein the pin 5 press-fitted to the movable board 3, a vertical piece 43 formed with a retaining portion 44 for a slide member 6, and a coupling portion 47 coupled to a manual valve 9 of the automatic transmission as best seen in FIG. 2. The elongate hole 42 is formed to have a same width as the diameter of the pin 5 in a direction of sliding of the movable board 3, and a length formed longer than the diameter of the pin in a direction perpendicular thereto. The retaining portion 44 has a cutout 45 formed extending from one side thereof. The cut-out 45 has a crimp piece 46 for retaining the slide member 6 formed at an opening edge thereof through a small section of a contact portion 49. On the other hand, the coupling portion 47 has two claws 48 extending almost rectangular to a direction of movement of the movable board 3, which are formed by bending to an almost horizontal direction.

Figure 8:
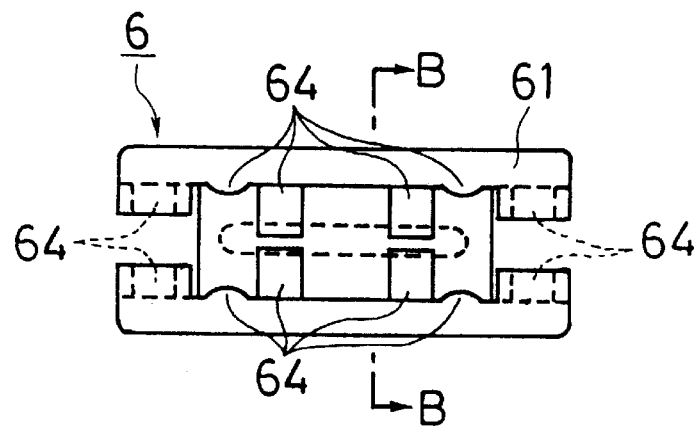
FIG. 8 is an elevational view showing a slide member of the first embodiment.
Figure 9:
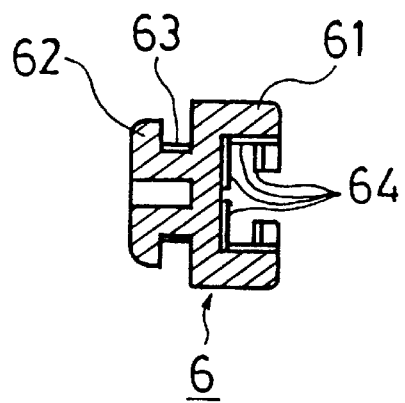
FIG. 9 is a sectional view taken on line B—B in FIG. 8, showing the slide member of the first embodiment.

The slide member 6, as shown in FIGS. 8 and 9, is formed of a synthetic resin to have thermal resistance and oil resistance similarly to the printed circuit board 1. The slide member 6 has slide portions 61 in a channel form to be fitted to the guide rail 19 of the printed circuit board 1, and grooves 63 formed between the slide portion 61 and a head portion 62 so as to be fitted to the cut-out 45 of the operating member 4. The channel-form slide portions 61 each have two arcuate protrusions 64, 64 in an inner surface thereof which slidably contact with the first to five guide portions 191 to 195. The protrusions 64, 64 are provided to reduce the contact area with the guide rail 19 for decreasing sliding resistance thereto, and provide positional accuracy in contact with the guide rail 19 when the slide member 6 is formed. Meanwhile, the two, upper and lower, separated protrusions 64, 64 opposite to the first guide surface 191 are provided to prevent a divisional line from being formed along the vertical center in the first guide surface 191 due to die forming.

The frame body 7 is a member formed by pressing a metal sheet, which has in a lower portion 71 an open hole 72 having a sufficient size for slidably receiving the pin 5 as well as allowing free passage of liquid therethrough. The frame body 7 also has crimp pieces 74 formed in lateral portions thereof. The movable board 3 is accommodated within a space defined by the frame body 7 and the printed circuit board 1. Note that the length of the open hole 72 is of a size that is somewhat longer than a range over which the pin 5 slidably moves. Furthermore, the open hole 72 has downwardly slanted surfaces 73 formed in opposite side edges for allowing the oil intruded into the inside of the frame body 7 to flow out.

A bracket 8 is a member formed by pressing a metal sheet into a crank form, and has a base portion 81 welded to the frame body 7, an attaching piece 82 extending from the base portion 81 in a manner departing from the lower portion 71, and attaching holes 83 formed in the attaching piece 82 for attachment onto a case of the automatic transmission (not shown).

A positioning pin 131, as shown in FIG. 2, is a member in an E-shaped form for being used to bring into coincidence the moving position of the movable board 3 with the moving position of the manual valve 9. The positioning is made by engaging two positioning holes 13 formed in the upper surface of the printed circuit board 1 with the claws 48 of the operating member 4.

During assembly for the first embodiment, the movable board 3, riveted with the movable contact 2 and press-fitted with the pin 5, is first placed on the printed circuit board 1 having the fixed contacts 11 in a manner such that the protuberances 31 are positioned between the first wall 14 and the second wall 15. Then the printed circuit board 1 is covered by the frame body 7, and the crimp pieces 74 are fitted in the crimp portions 18 of the printed circuit board 1 and then bent for placing them into one body as shown in FIG. 2. Subsequently the slide member 6 at its slide portion 61 is inserted, from an end of the guide rail 19, onto the guide rail 19 of the printed circuit board 1.

On the other hand, the slide member 6 is fixed on the operating member 4 by fitting the pin 5 in the elongate hole 42 of the operating member 4, sliding the slide member 6 so as to fit the groove portion 63 in the cut-out 45, and bending the crimp piece 46. Finally, the base portion 81 of the bracket 8 is welded on the frame body 7, thus completing a slide switch. To assemble this slide switch onto the automatic transmission, the positioning pin 131 is previously fitted between the positioning hole 13 of the printed circuit board 1 and the claw 48 of the operating member 4. The slide switch in this state is coupled to a manual valve 9 and a detent lever 10 within the interior of the automatic transmission, fixing the bracket 8 through an attaching hole 83 while positioning the switch in position, and then the positioning pin 131 is removed.

The operation of the first embodiment will now be explained. The slide switch device of the first embodiment, as shown in FIG. 2, is attached to the case of the automatic transmission with the position of the printed circuit board 1 directed upward. The operating member 4 is coupled at the coupling portion 47 to the manual valve 9 and the detent lever 10. Accordingly, when the detent lever 10 is operated by operation of the shift lever (not shown) by the operator, the manual valve 9 and the operating member 4 are moved to a corresponding shift position in an interlocking manner. The movable contact 2 is also moved together with the operating member 4 to change the position of contacting with the fixed contact 11. This allows the slide switch device to switch operate corresponding to the shift position.

On this occasion, the slide switch device is attached to the automatic transmission case in a position shown in FIG. 2 as stated before, wherein the fixed contact 11 of the printed circuit board 1 is directed downward. Consequently, the foreign matter attached to the fixed contact 11 falls down due to gravity, thus being removed from the fixed contact 11. Even where the foreign matter attached to the fixed contact is difficult to be stripped off, the protuberance 31 of the movable board 3 acts to wipe the surface of the fixed contact 11 to forcibly remove the foreign matter out of the fixed contact 11. In addition, the first wall 14 and the second wall 15 keep insulation between the fixed contacts 11. Therefore, even where the slide switch device is used by being immersed in the oil contaminated with mixed conductive foreign matter within the automatic transmission, there occurs no poor insulation between the fixed contacts 11.

When the operator manipulates the shift lever (not shown) to move the operating member together with the detent lever 10 and the manual valve 9 to a corresponding shift position, the operating member 4 slides on the guide rail 19 through the slide member 6 in a manner restricted of its movement to upper, lower, left and right and in a rotational direction. The movement of the slide member 6 is transmitted to the movable board 3 through the pin 5 fitted in the elongate hole 42. At this moment, the operating member 4 is guided on the guide rail 19 through the slide member 6, and the movable panel 3 at the protuberances 31 is guided along the first wall 14 of the printed circuit board 1. The guiding of the operating member 4 and the movable board 3 are in an independent manner, and they are kept in the relationship that is tight with respect to the sliding direction but loose in the direction perpendicular to the sliding direction. Accordingly they are prevented from getting out of order or being tangled during their sliding.

Figure 10:
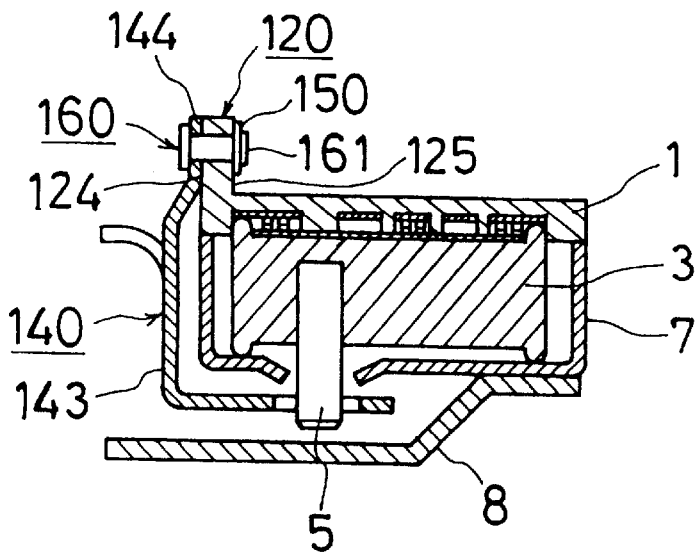
FIG. 10 is a sectional view similar to FIG. 3, showing a second embodiment of the present invention.
Figure 11:
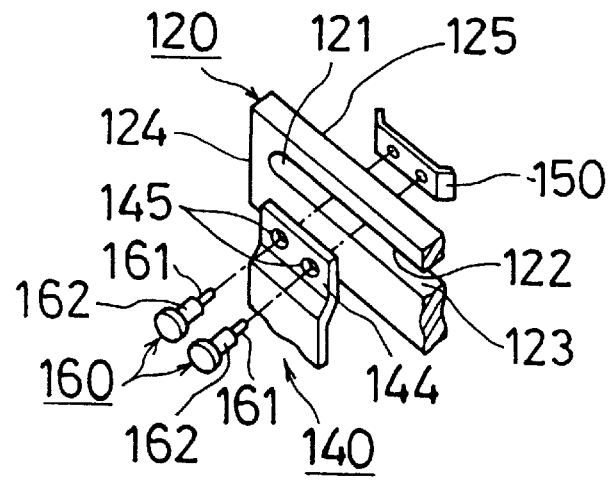
FIG. 11 is a disassembled perspective view of an essential part of the second embodiment shown in FIG. 10.

A second embodiment of the present invention will now be explained with reference to FIGS. 10 and 11 of the drawings.

The slide switch device of the second embodiment is of roughly the same structure as the slide switch device of the first embodiment stated above. Here, explanations will be made on a guide rail 120, an operating member 140, and a slide member 160, which are different in structure from those of the first embodiment slide switch device.

First, a guide rail 120 is formed in a flange form extending from one side edge of the printed circuit board 1. The guide rail 120 is formed with an elongate hole 121 extending lengthwise. On the other hand, an operating member 140 has a vertical piece 143 having a retaining portion 144 extending therefrom and formed with two through holes 145 such that the retaining portion is placed in slidable contact with the guide rail 120. A stepped rivet serves as slide member 160 inserted through the through hole 145 of the retaining portion 144 and the elongate hole 121 of the guide rail 120. The stepped rivet has a tip 161 to be crimped through a retainer plate 150 and a large diameter portion 162 serving as a slide portion.

In the second embodiment, the guide rail 120 has four guide surfaces comprised respectively of upper and lower surfaces 122, 123 around the elongate hole 121 and opposite side surfaces 124, 125 in the flange, which serve to restrict the movement of the operating member 140 to the upper, lower, left, and right and in the rotational direction. Incidentally, the operation of the slide switch device of the second embodiment is similar to the slide switch device of the first embodiment described above. An explanation of the operation of the second embodiment is, therefore, omitted.

Figure 12:
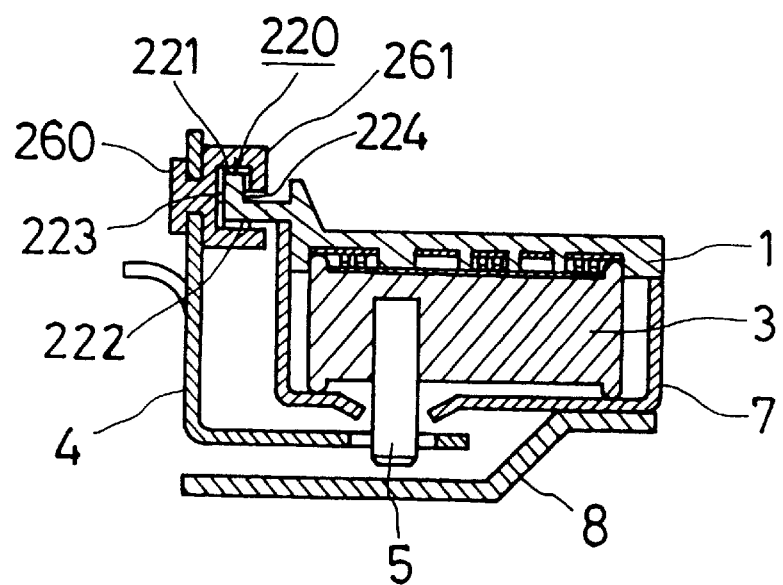
FIG. 12 is a sectional view similar to FIG. 3, showing a third embodiment of the present invention.

FIG. 12 shows a third embodiment of the present invention. A guide rail 220 and a slide member 260 of the third embodiment are different in structure from the first and second embodiments of the slide switch devices.

The third embodiment is similar to the first embodiment in that the guide rail 220 is provided extending from the printed circuit board 1. However, the third embodiment is different in that the guide rail 220 is formed in a sectional L-shaped form, instead of a sectional T-shaped form as in the first embodiment. Consequently, the first embodiment has five guide surfaces 191 to 195, whereas the third embodiment has four guide surfaces 221 to 224 without a surface corresponding to the fifth guide surface 195. To meet this structure, the slide portion 261 of the slide member 260 is in a form that extends downward from a top side end of a sectional rectangular U-shaped form. There is no opposite point to the fifth guide surface 195 of the first embodiment. The other structure of the third embodiment is the same as the first embodiment, and the operation is also the same as the operation of the slide switch device of the first embodiment described above. A further explanation of the operation of the third embodiment is, therefore, omitted.

Incidentally, although in the above embodiments the guide rail was formed integral with the printed circuit board, it may be integrally formed with the frame body. Furthermore, although the slide member was formed separately from the operating member, it may be integrally formed with the operating member, that is, formed of a resin into one body. Alternatively, if the operating member is formed of a metal, the slide portion fitted with the guide rail may be roll-formed.

As explained above, according to the present invention, a slide switch device is provided having a movable contact, a movable board for supporting the movable contact, a fixed contact with which the movable contact is in slidable contact, and a printed circuit board for supporting the fixed contact. The slide switch device is characterized by a guide rail provided on a printed circuit board side so as to extend in a direction that the movable contact slides, and a slide portion fitted on the guide rail being provided in an operating member for driving the movable board. Therefore, the operating member is positively supported in a determined position with respect to the guide rail, and smooth sliding is possible for the operating member and the movable board.

According to another aspect of the present invention, a pin is projectingly provided in the movable board, and an elongate hole that is long in a direction perpendicular to the sliding direction of the movable board is provided in the operating member. Therefore, independent sliding is possible for the movable board and the operating member so that no tangling force acts upon the movable board, providing further smooth sliding.

According to another aspect of the present invention, the operating member is formed in a channel form that is in contact with the guide rail. Therefore, the freedom is provided only in the direction of sliding and, accordingly, the operating member is held in position more positively.

According to another aspect of the present invention, the slide portion is arranged in the vicinity of an external input position with respect to the operating member. Therefore, the operating member when applied by an external forced has reduced moment acting thereon, further improving the smoothness during sliding.

According to yet another aspect of the present invention, a slide member having the slide portion is formed separately from the operating member, and a crimp piece for fixing the slide member is integrally formed with the operating member. Therefore, the fixing of the slide member is easy to perform and the operation of assembling is enhanced.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. In a slide switch device having a movable contact, a movable board for supporting the movable contact, a fixed contact with which the movable contact is in slidable contact, and a printed circuit board for supporting the fixed contact, the slide switch comprising:

a guide rail provided on a printed circuit board side so as to extend in a direction that the movable contact slides; and a slide portion fitted on the guide rail and being received within an operating member for driving the movable board in a sliding direction.

2. The slide switch device according to claim 1, wherein a pin is projectingly provided in the movable board, and an elongate hole that is long in a direction perpendicular to the sliding direction of the movable board is provided in the operating member.

3. The slide switch device according to claim 2, wherein the slide portion is formed in a channel form that is in contact with the guide rail.

4. The slide switch device according to claim 3, wherein the slide portion is arranged in the vicinity of an external input position with respect to the operating member.

5. The slide switch device according to claim 4, wherein a slide member having the slide portion is formed separately from the operating member, and a crimp piece, integrally formed with the operating member, for fixing the slide member to the operating member.

6. The slide switch device according to claim 1, wherein the slide portion is formed in a channel form that is in contact with the guide rail.

7. The slide switch device according to claim 1, wherein the slide portion is arranged in the vicinity of an external input position with respect to the operating member.

8. The slide switch device according to claim 1, wherein a slide member having the slide portion is formed separately from the operating member, and a crimp piece, integrally formed with the operating member, for fixing the slide member to the operating member.

9. A slide switch device, comprising:

a movable board having a movable contact supported thereon, and a pin projecting from the movable board;

a printed circuit board having a fixed contact supported thereon with which the movable contact is in slidable contact;

a guide rail provided on a side of the printed circuit board so as to extend in a direction that the movable contact slides; and an operating member for driving the movable board, the operating member having a slide portion fitted on the guide rail and an elongate hole that is long in a direction perpendicular to a sliding direction of the movable board, said pin being received within said elongate hole.

10. The slide switch device according to claim 9, further comprising a frame body having an elongate open hole extending in the sliding direction of the movable board, said frame body being positioned between the movable board and the operating member.

11. The slide switch device according to claim 9, wherein the slide portion is formed in a channel form that is in contact with the guide rail.

12. The slide switch device according to claim 9, wherein the slide portion is arranged in the vicinity of an external input position with respect to the operating member.

13. The slide switch device according to claim 9, wherein a slide member having the slide portion is formed separately from the operating member, and a crimp piece for fixing the slide member is integrally formed with the operating member.

* * * * *